US 7,588,619 B2

(12) United States Patent
Chilton et al.

(10) Patent No.: US 7,588,619 B2
(45) Date of Patent: Sep. 15, 2009

(54) CROSS-FLOW FILTER MEDIA AND FILTER ASSEMBLY

(75) Inventors: Donald T. Chilton, Gastonia, NC (US); Jason L. Tate, Bessemer City, NC (US); Mitchell J. Baker, Lincolnton, NC (US)

(73) Assignee: Wix Filtration Corp., Gastonia, NC (US)

( * ) Notice: Subject to any disclaimer, the term of this patent is extended or adjusted under 35 U.S.C. 154(b) by 324 days.

(21) Appl. No.: 11/564,007

(22) Filed: Nov. 28, 2006

(65) Prior Publication Data

US 2008/0120952 A1 May 29, 2008

(51) Int. Cl.
B01D 46/52 (2006.01)
(52) U.S. Cl. .......................... 55/521; 55/385.3; 55/486; 55/488; 55/489; 55/498; 55/520; 55/DIG. 5
(58) Field of Classification Search ............... 55/385.3, 55/498, 520, 521, DIG. 5, 486, 488, 489; 123/198 E; 210/493.1, 493.4, 493.5
See application file for complete search history.

(56) References Cited

U.S. PATENT DOCUMENTS

| | | | |
|---|---|---|---|
| 3,070,937 A * | 1/1963 | Bub | 96/121 |
| 4,173,097 A | 11/1979 | Staby | |
| 4,234,324 A * | 11/1980 | Dodge, Jr. | 96/99 |
| 4,310,419 A * | 1/1982 | Nara et al. | 210/493.4 |
| 4,410,427 A | 10/1983 | Wydeven | |
| 4,589,983 A | 5/1986 | Wydevan | |
| 5,060,972 A | 10/1991 | Satoh et al. | |
| 5,252,182 A | 10/1993 | Hong | |
| D398,046 S | 9/1998 | Gillingham et al. | |
| D399,944 S | 10/1998 | Gillingham et al. | |
| 5,820,646 A | 10/1998 | Gillingham et al. | |
| D401,306 S | 11/1998 | Ward et al. | |
| 5,902,364 A | 5/1999 | Tokar et al. | |
| D417,268 S | 11/1999 | Gillingham | |
| 6,059,851 A | 5/2000 | DePietro, III et al. | |
| 6,089,289 A | 7/2000 | Florjancic | |
| 6,179,890 B1 | 1/2001 | Ramos et al. | |
| D437,402 S | 2/2001 | Gieseke et al. | |
| 6,190,432 B1 | 2/2001 | Gieseke et al. | |
| 6,235,195 B1 | 5/2001 | Tokar | |

(Continued)

FOREIGN PATENT DOCUMENTS

DE    30 43 232    11/1979

(Continued)

*Primary Examiner*—Duane Smith
*Assistant Examiner*—Robert A Clemente
(74) *Attorney, Agent, or Firm*—Honigman Miller Schwartz and Cohn LLP (57) ABSTRACT

A filter media including a first sheet having an inner surface and an outer surface, a second sheet having an inner surface and an outer surface, wherein the inner surface of the first sheet and the inner surface of the second sheet at least in part define at least two fluid channels between the first sheet and the second sheet to define a filter media having a first axial end and a second axial end, wherein the at least two fluid channels extend between the first axial end and the second axial end, and wherein, interior to said axial ends, the first and second sheets define at least one opening between a first one of said at least two fluid channels and a second one of said at least two fluid channels such that fluid can uninterruptedly flow between the first one of said at least two fluid channels and the second one of the at least two fluid channels, and further wherein the at least two fluid channels and the at least one opening are at least defined in part by a surface characteristic of the first sheet and a surface characteristic of the second sheet.

22 Claims, 8 Drawing Sheets

U.S. PATENT DOCUMENTS

| | | | |
|---|---|---|---|
| D447,549 S | 9/2001 | Gieseke et al. | |
| D450,827 S | 11/2001 | Gieseke et al. | |
| D450,828 S | 11/2001 | Tokar | |
| 6,340,375 B1 | 1/2002 | DePietro, III et al. | |
| 6,348,084 B1 | 2/2002 | Gieseke et al. | |
| 6,348,085 B1 | 2/2002 | Tokar et al. | |
| 6,350,291 B1 | 2/2002 | Gieseke et al. | |
| 6,352,578 B1 * | 3/2002 | Sakata et al. | 96/134 |
| D455,483 S | 4/2002 | Gieseke et al. | |
| D460,169 S | 7/2002 | Anderson et al. | |
| D461,003 S | 7/2002 | Gieseke et al. | |
| 6,416,605 B1 | 7/2002 | Golden | |
| D461,884 S | 8/2002 | Gieseke et al. | |
| D464,129 S | 10/2002 | Xu et al. | |
| D466,602 S | 12/2002 | Gieseke et al. | |
| 6,517,598 B2 | 2/2003 | Anderson et al. | |
| 6,533,845 B2 | 3/2003 | Tokar et al. | |
| D473,637 S | 4/2003 | Golden | |
| 6,547,857 B2 | 4/2003 | Gieseke et al. | |
| 6,576,032 B2 * | 6/2003 | Maus | 55/446 |
| 6,610,117 B2 | 8/2003 | Gieseke et al. | |
| 6,610,126 B2 | 8/2003 | Xu et al. | |
| D483,459 S | 12/2003 | DeWit et al. | |
| D484,584 S | 12/2003 | Anderson et al. | |
| 6,669,913 B1 * | 12/2003 | Haberkamp | 422/180 |
| 6,673,136 B2 | 1/2004 | Gillingham et al. | |
| 6,685,833 B2 * | 2/2004 | Lippold | 210/493.1 |
| 6,746,518 B2 | 6/2004 | Gieseke et al. | |
| 6,776,814 B2 * | 8/2004 | Badeau et al. | 55/385.3 |
| 6,783,565 B2 | 8/2004 | Gieseke et al. | |
| 6,783,881 B2 | 8/2004 | Stenersen et al. | |
| D497,202 S | 10/2004 | Carter et al. | |
| 6,800,117 B2 | 10/2004 | Barris et al. | |
| 6,824,581 B1 * | 11/2004 | Tate et al. | 55/385.3 |
| 6,852,141 B2 | 2/2005 | Bishop et al. | |
| 6,857,188 B2 * | 2/2005 | Maus | 29/896.62 |
| 6,878,190 B1 | 4/2005 | Xu et al. | |
| D506,539 S | 6/2005 | Bishop et al. | |
| 6,960,245 B2 | 11/2005 | Tokar et al. | |
| 6,966,940 B2 | 11/2005 | Krisko et al. | |
| 6,974,490 B2 | 12/2005 | Gillingham et al. | |
| 6,994,742 B2 | 2/2006 | Barris et al. | |
| 6,994,744 B2 | 2/2006 | Tokar et al. | |
| 6,997,968 B2 | 2/2006 | Xu et al. | |
| 7,001,450 B2 | 2/2006 | Gieseke et al. | |
| 7,008,467 B2 | 3/2006 | Krisko et al. | |
| 7,090,712 B2 | 8/2006 | Gillingham et al. | |
| 7,122,068 B2 | 10/2006 | Tate et al. | |
| 7,217,309 B2 * | 5/2007 | Colamussi | 55/521 |
| 7,425,227 B1 * | 9/2008 | Hutchison et al. | 55/521 |
| 2003/0121845 A1 | 7/2003 | Wagner et al. | |
| 2004/0221555 A1 | 11/2004 | Engelland et al. | |
| 2006/0091084 A1 * | 5/2006 | Merritt et al. | 210/767 |
| 2006/0101795 A1 | 5/2006 | Krisko et al. | |
| 2006/0101998 A1 | 5/2006 | Gieseke et al. | |
| 2006/0123990 A1 | 6/2006 | Tokar et al. | |
| 2006/0151383 A1 * | 7/2006 | Choi | 210/493.1 |
| 2006/0272305 A1 * | 12/2006 | Morgan | 55/521 |

FOREIGN PATENT DOCUMENTS

EP      1 254 689      11/2002

* cited by examiner

CROSS-FLOW FILTER MEDIA AND FILTER ASSEMBLY

FIELD

The disclosure generally relates to filter constructions and to filter media constructions for filtering one or more fluid mediums.

BACKGROUND

Filter media is known in the art and is typically utilized to filter a fluid medium, such as, for example, an air intake stream, proximate, for example, an air intake port of an internal combustion engine. Accordingly, the filter media may remove foreign particulates, contaminates, and the like from entering into and subsequently upsetting or degrading the performance of the internal combustion engine.

A known filter media may include, for example, at least two or more continuous fluid flow channels that receive, for subsequent filtering, an unfiltered fluid medium. If the filter media collects, in one or more of the continuous fluid flow channels, a substantial amount of foreign particulates, contaminates, or the like, the foreign particulates, contaminates, or the like may thereby clog a portion of the filter media and significantly reduce the holding capacity of the foreign particulates, contaminates, or the like in the filter media. Additionally, there is potential for relatively larger contaminates, such as, for example, foliage, bugs, insects, or the like, that may block an end of the filter media, thereby preventing a movement of an unfiltered fluid medium through the filter. As a result, the ability to remove the foreign particulates, contaminates, or the like from the air intake stream may be significantly reduced, or, the efficiency of the internal combustion engine may be significantly reduced.

A need therefore exists for an improved filter media construction that overcomes the shortcomings of the prior art.

SUMMARY

A filter media including a first sheet having an inner surface and an outer surface, a second sheet having an inner surface and an outer surface, wherein the inner surface of the first sheet and the inner surface of the second sheet at least in part define at least two fluid channels between the first sheet and the second sheet to define a filter media having a first axial end and a second axial end, wherein the at least two fluid channels extend between the first axial end and the second axial end, and wherein, interior to said axial ends, the first and second sheets define at least one opening between a first one of said at least two fluid channels and a second one of said at least two fluid channels such that fluid can uninterruptedly flow between the first one of said at least two fluid channels and the second one of the at least two fluid channels, and further wherein the at least two fluid channels and the at least one opening are at least defined in part by a surface characteristic of the first sheet and a surface characteristic of the second sheet.

BRIEF DESCRIPTION OF THE DRAWINGS

The present disclosure will now be described, by way of example, with reference to the accompanying drawings, in which.

DETAILED DESCRIPTION

Figures 1, 2:
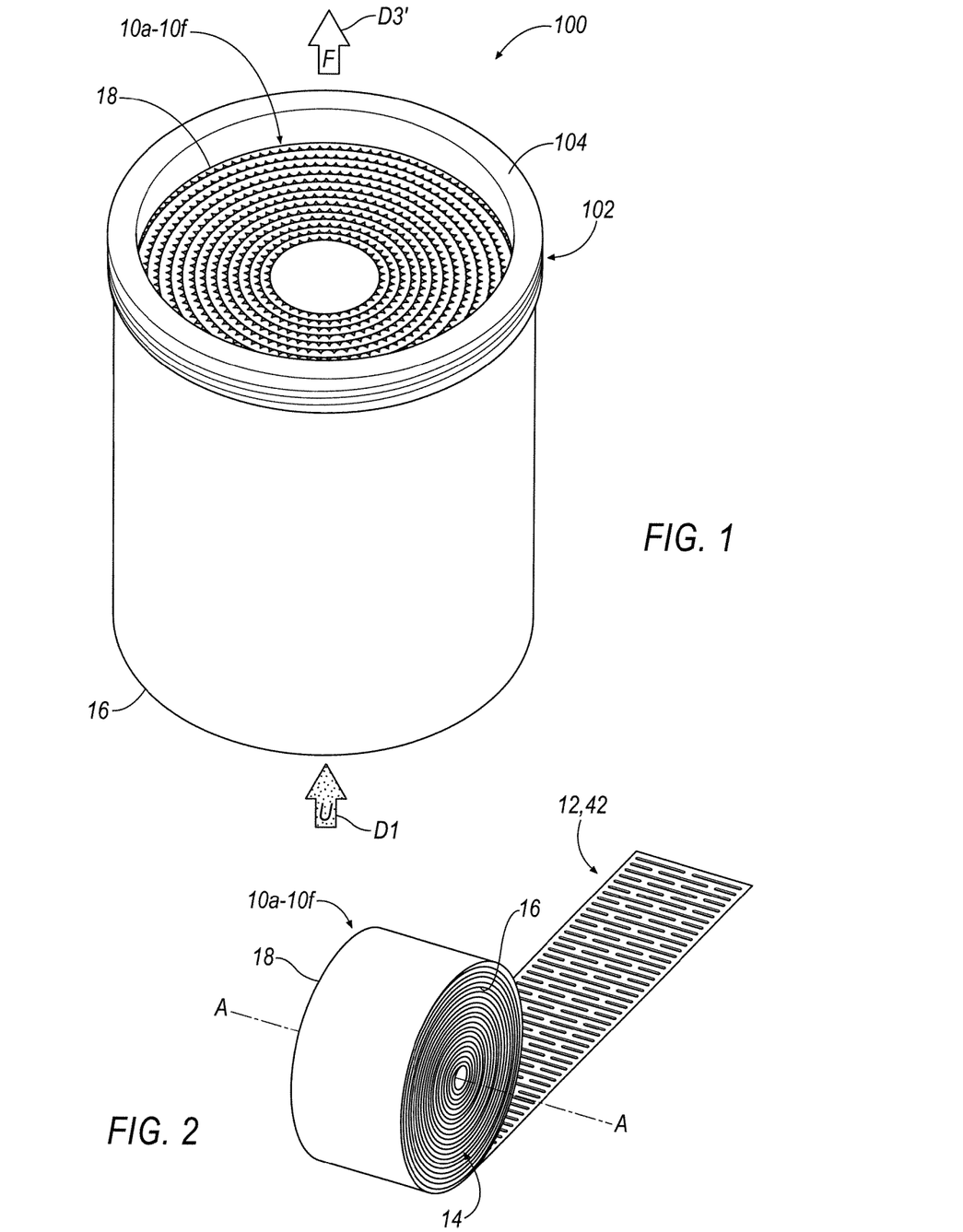
FIG. 1 is a perspective view of a filter assembly according to an embodiment.
FIG. 2 is a perspective view of a filter media prepared in a rolled bundle according to an embodiment.

Referring to FIG. 1, a filter assembly is shown generally at 100 according to an embodiment. The filter assembly 100 includes a filter media, which is shown generally at 10*a* (FIG. 3A), 10*b* (FIG. 3B), 10*c* (FIG. 3C), 10*d*, (FIG. 4A), 10*e* (FIG. 4B), and 10*f* (FIG. 4C) according to an embodiment. The filter media 10*a*-10*f* is designed to substantially remove foreign particulates, contaminates, and the like from entering into and subsequently upsetting or degrading the performance of a device, such as, for example, an internal combustion engine (not shown). Additionally, the filter media 10*a*-10*f* provides an improved filtering and holding capacity of the foreign particulates, contaminates, or the like.

Referring to FIG. 2, the filter media 10*a*-10*f* includes, for example, a sheet of filter material 12 (FIGS. 3A-3C), 42 (FIGS. 4A-4C) that is axially-wound about an axis, A-A, to constitute a core of filter layers 14 having a first axial end 16 and a second axial end 18. Although the filter media 10*a*-10*f* is shown axially-wound about the axis, A-A, and into a substantially circular pattern, it will be appreciated that the core of filter layers 14 may be wound about the axis, A-A, in any desirable, non-circular pattern, such as, for example, an oval pattern, an oblong pattern, a square pattern, a rectangular pattern, a triangular pattern, or the like. Additionally, it will be appreciated that the sheet of material 12, 42 does not have to be wound to form a core of filter layers 14 and that the sheet of filter material 12, 42 may be simply utilized as a substantially planar sheet for any desirable application.

Referring to FIG. 1, the filter assembly 100 may also include, for example, a seal portion 102 and a frame construction 104. As illustrated, the frame construction 104 is secured to the second axial end 18 of the core of filter layers 14. The first axial end 16 of the filter media 10*a*-10*f* generally defines a fluid flow entrance where, for example, an unfiltered fluid medium, U, is generally shown moving according to the direction of the arrow, D1, into the filter media 10*a*-10*f*. Once inside the filter media 10*a*-10*f*, the unfiltered fluid medium, U, travels through the core of filter layers 14 and exits the filter media 10*a*-10*f* at the second axial end 18 such that foreign particulates, contaminates, and the like in the unfiltered fluid medium, U, are substantially removed therefrom to provide a filtered fluid medium, F. According to an embodiment, the filtered fluid medium is shown generally moving according to the direction of an arrow, D3', from the second axial end 18.

Accordingly, the second axial end 18 may be inserted in an air intake port/duct (not shown) of an internal combustion engine to provide substantially clean, filtered air, F, to the internal combustion engine. Although the first axial end 16 is described above as corresponding to a fluid flow entrance, and the second axial end 18 is described above as corresponding to a fluid flow exit, the first and second axial ends 16, 18 may be reversed; that is, the first axial end 16 may correspond to a fluid flow exit while the second axial end 18 may correspond to a fluid flow entrance. Even further, although the first and second axial ends 16, 18 are shown to be substantially planar and parallel, it will be appreciated that the first and second axial ends 16, 18 may include a non-planar shape, such as, for example, a frustoconical shape; as such, the first and second axial ends 16, 18 may be oriented in a non-parallel relationship.

Figure 3A:
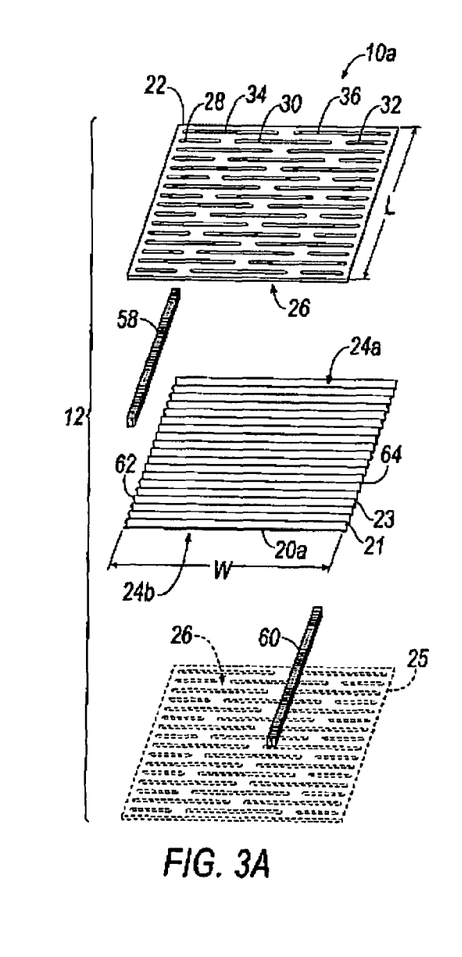
FIGS. 3A-3C illustrate perspective exploded views of a plurality of filter material sheets that form a filter media according to an embodiment.
Figure 3B:
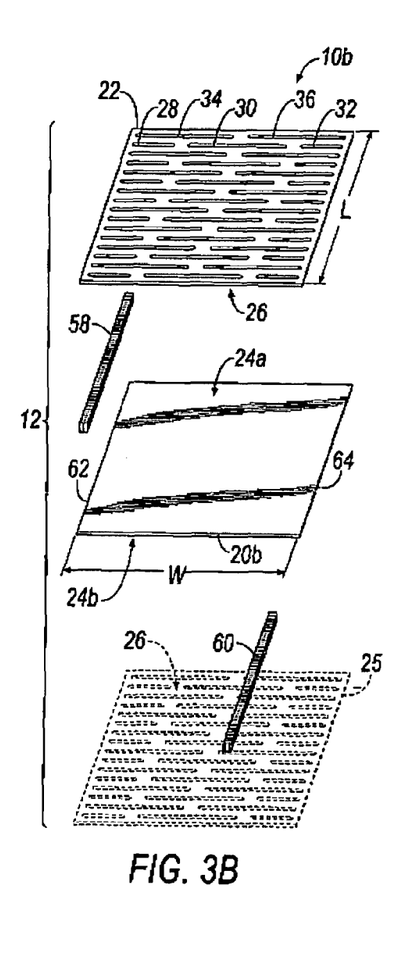
Figure 3C:
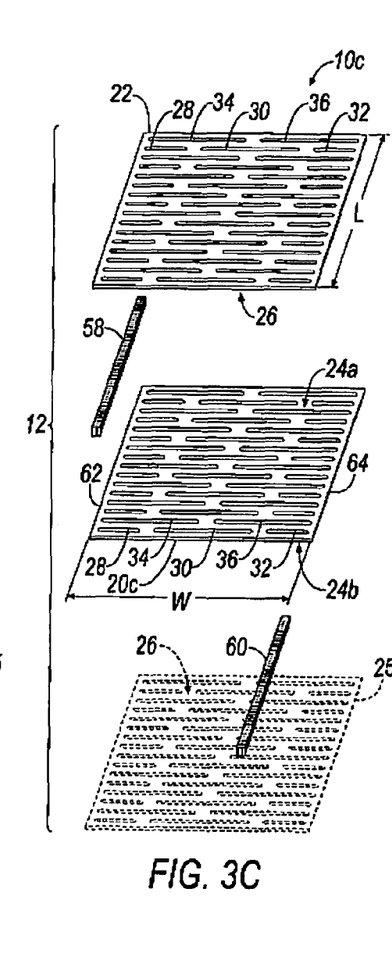

Referring now to FIGS. 3A-3C, the filter media 10a, 10b, 10c is shown according to an embodiment. As illustrated, prior to being constructed into the form of the sheet of filter material 12 for rolling into a core of filter layers 14, the sheet of filter material 12 is shown to include a first sheet of material shown generally at 20a, 20b, and 20c, respectively, and a second sheet of material shown generally at 22. Once rolled into a core of filter layers 14 (as illustrated in FIG. 1 and FIG. 2,) the first sheet of material 20a-20c provides a rear or backing surface for the second sheet of material 22, which is shown in phantom generally at 25. It is to be appreciated that locational terms such as "rear," "backing surface" and the like are terms for description and, upon considering this disclosure, one of ordinary skill in the art will recognize that they should not limit the disclosure. As such, although the exploded view of a segment of the core of filter layers 14 in FIGS. 3A-3C appears to include three sheets of material, it will be appreciated that a segment of the core of filter layers 14 includes first and second sheets of material 20a-20c, 22. The connection of one or more of the facing surfaces 24a, 24b of the first sheet of material 20a-20c and an inner surface 26 of the second sheet of material 22 will be described below.

In the following discussion, the terms "irregularity" and "irregularity-free" are utilized to describe the general shape, contour, or surface characteristic of the sheets 20a, 20b, 20c, 22 that comprise the sheet of filter material 12. According to an embodiment, an "irregularity" means that at least one of the sheets 20a, 20b, 20c, 22 includes at least a portion of its surface that is substantially non-even having, for example, an embossment, corrugation pattern, or the like; as such, the embossment, corrugation or the like includes a slope that is substantially greater or less than zero. Conversely, a sheet 20a, 20b, 20c, 22, or, a portion of the sheet 20a, 20b, 20c, 22 that is described to be "irregularity-free" means that the sheet 20a, 20b, 20c, 22, or, portion of the sheet 20a, 20b, 20c, 22 includes a substantially even surface having, for example, a substantially continuous, flat, smooth, or planar surface characteristic such that any change of the slope of the surface characteristic is zero or is approximately zero.

As illustrated in FIG. 3A, the first sheet of material 20a includes surface irregularities in the form of a corrugated surface having a series of peaks 21 and valleys 23. As illustrated in FIG. 3B, the first sheet of material 20b is irregularity-free and includes, for example, a substantially smooth, even surface. As illustrated in FIG. 3C, the first sheet of material 20c includes a plurality of interrupted surface irregularities 28-36 that are, according to an embodiment, a plurality of interrupted embossments. The second sheet of material 22 in FIGS. 3A-3C may also include, according to an embodiment, a plurality of interrupted surface irregularities 28-36 that are, according to an embodiment, interrupted embossments. The embossments 28-36, may, for example, extend from one or both sides of the second sheet of material 22.

According to an embodiment, the surface irregularities 28-36 are arranged in a substantially parallel relationship along a length, L, of the sheet 12, however upon considering this disclosure, it will be appreciated that the surface irregularities 28-36 may alternatively be arranged in a substantially parallel relationship along a width, W, of the sheet 12. However, it will also be appreciated after considering this disclosure that the surface irregularities 28-36 may alternatively be arranged in a substantially non-parallel relationship along the length, L, and/or width, W. According to an embodiment, the surface irregularities 28-36 are arranged in uniform series along the length, L, or width, W, of the sheet 12, however, it will be appreciated upon considering this disclosure that the surface irregularities 28-36 may alternatively be arranged in a random series along the length, L, or width, W, of the sheet 12.

The plurality of interrupted surface irregularities 28-36 are not limited to being interrupted embossments and may include, for example, any type of interrupted surface irregularity such as, for example, a bump, swelling, lump, bulge, or the like that extends from the second sheet of material 22. Accordingly, the bump, swelling, lump, bulge, or the like may be formed from an increased thickness, T (FIGS. 6A-6C), of the second sheet of material 22 and not from a dimple 38 (FIGS. 6A-6C) extending into the inner surface 26 of the second sheet of material 22 that causes the second sheet of material 22 to extend and become embossed from its own thickness, T.

Figure 4A:
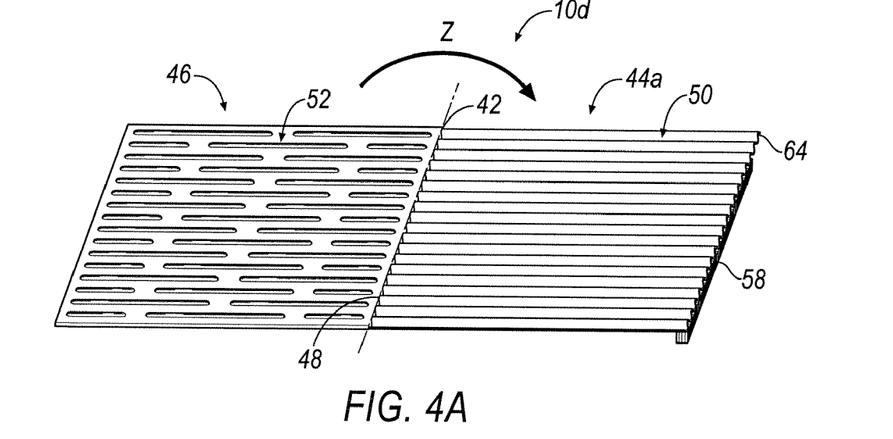
FIGS. 4A-4C illustrate perspective views of a one-sheet filter material in an unfolded state that forms a filter media according to an embodiment.
Figure 4B:
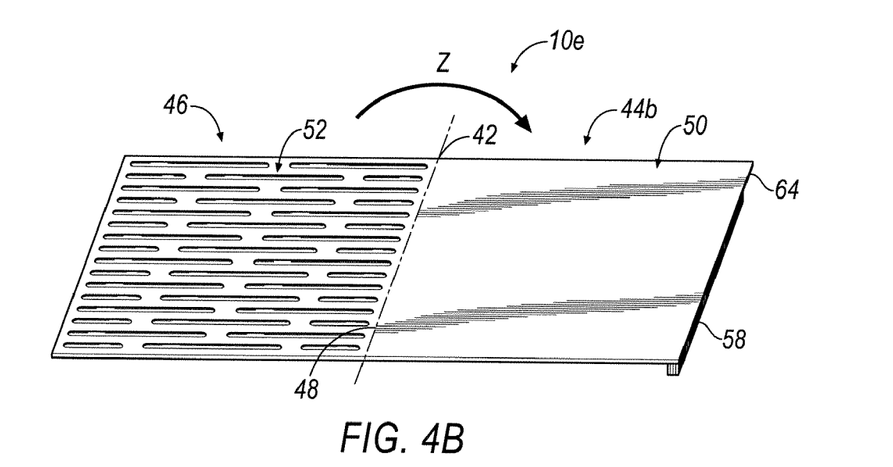
Figure 4C:
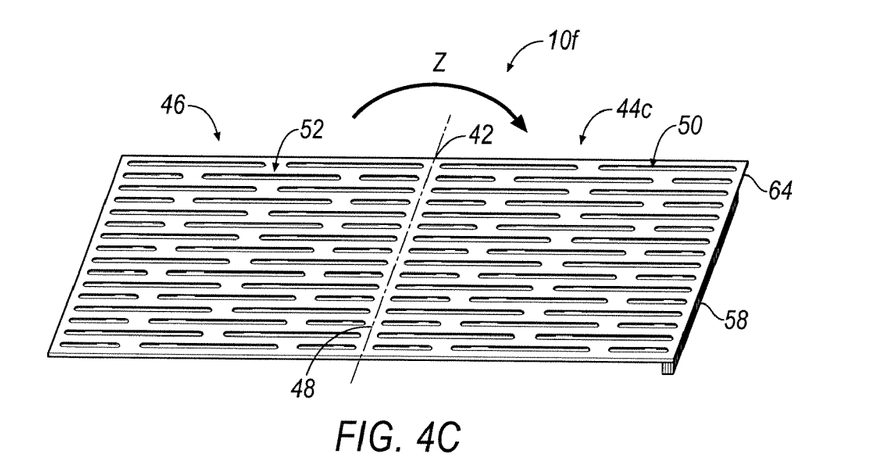

Referring to FIGS. 4A-4C, the filter media 10d, 10e, 10f is shown according to an embodiment. As illustrated, the filter media 10d, 10e, 10f functions similarly to the filter media of FIGS. 3A-3C, but, however, rather than including two individual unit/sheets 20a-20c, 22, the filter media 10d, 10e, 10f includes one sheet/unit of material 42 having a first sheet or portion 44a-44c and a second sheet or portion 46. First and second sheet portions may be formed from a unitary sheet of material, or, in an alternative embodiment, they may be separately formed and then joined along a seam (seam not shown). As seen in FIGS. 4A-4C, the first sheet or portion 44a, 44b, 44c is defined by the surface characteristics of the first sheet of material 20a, 20b, 20c shown in FIGS. 3A-3C, respectively, and the second portion 46 shown in FIGS. 4A-4C is defined by the surface characteristics of the second sheet of material 22 shown in FIGS. 3A-3C.

The filter media 10d-10f is formed when the first sheet or portion 44a-44c and the second sheet or portion 46 are folded about the a fold line 48 according to the direction of the arrow, Z (FIGS. 4A-4C), such that an inner surface 50 of the first sheet or portion 44a-44c is positioned adjacent to an inner surface 52 of the second sheet or portion 46. In an embodiment, the inner surfaces 50, 52 may also be joined together using any desirable method, such as, for example, with an adhesive, to form the filter media 10d, 10e, 10f. However, it is to be appreciated that they may not be physically joined and the invention should not be limited thereby.

Figure 5A:
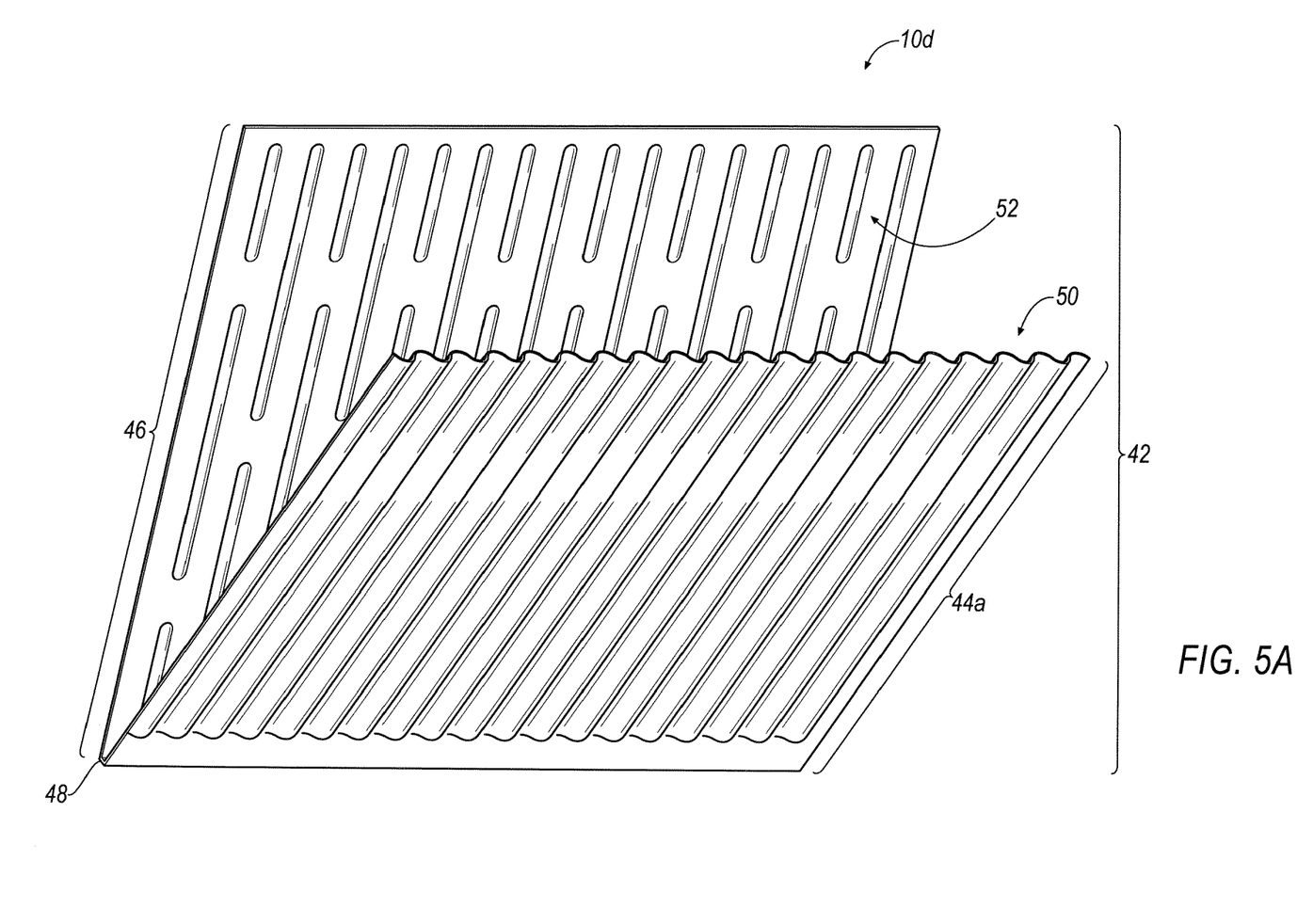
FIGS. 5A illustrates a perspective view of the one-sheet filter material according to FIG. 4A being folded about a fold line according to an embodiment.
Figure 5B:
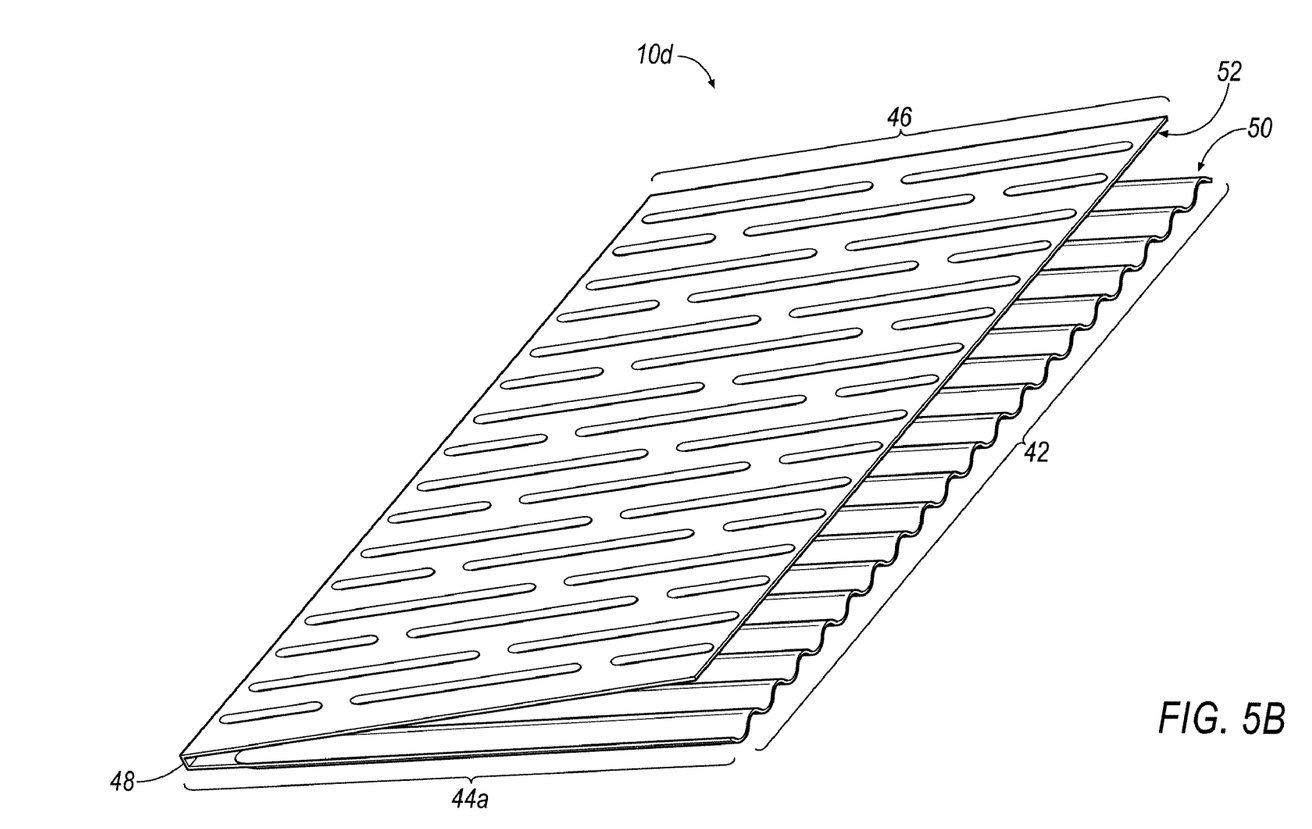
FIGS. 5B illustrates another perspective view of the one-sheet filter material according to FIG. 5A.
Figure 5C:
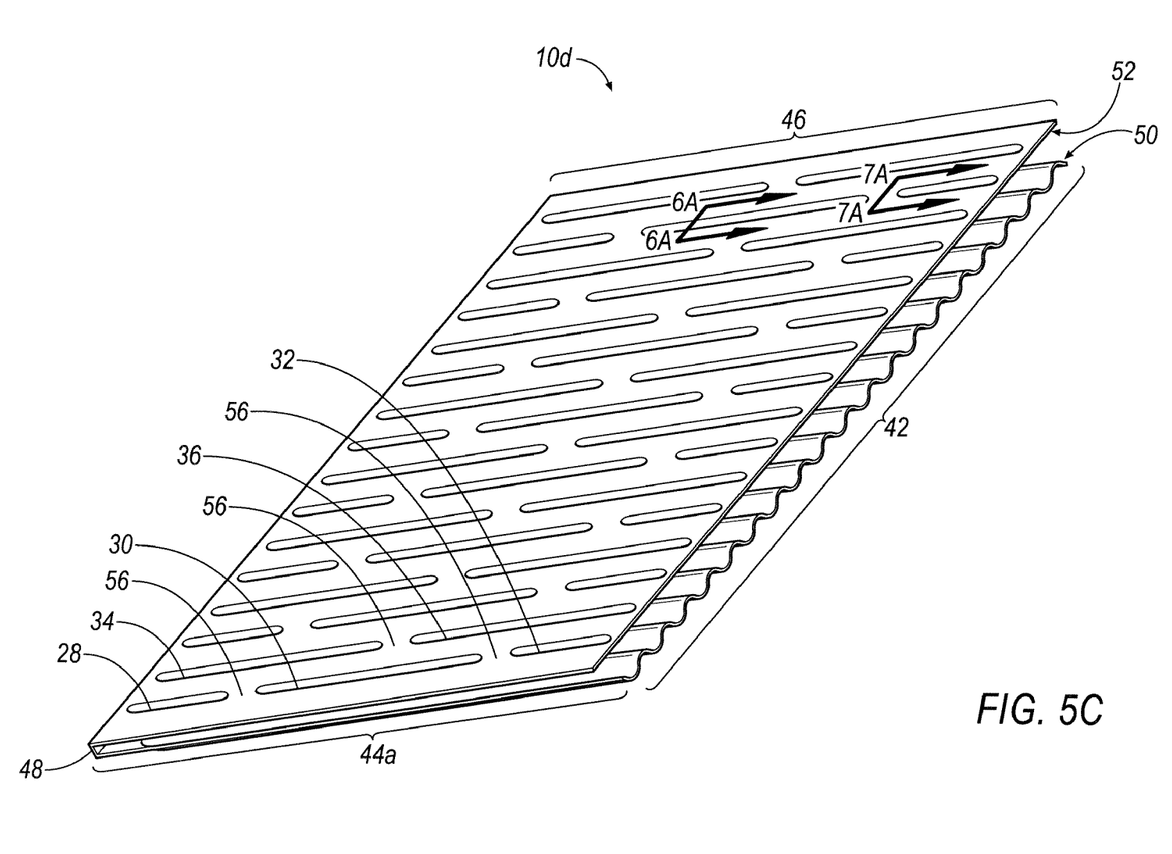
FIGS. 5C illustrates a perspective view of the one-sheet filter material according to FIG. 5B folded to form a filter media according to an embodiment.

According to an embodiment, as seen in FIG. 5C, the surfaces between the surface irregularity embossments 28-36 provide a plurality of substantially flat, irregularity-free regions 56 of the second sheet of material 22/second portion 46. The irregularity-free regions 56, according to an embodiment, are shown between the pairs of surface irregularity embossments identified at 28 and 30, 30 and 32, and 34 and 36, respectively.

Figure 6A:
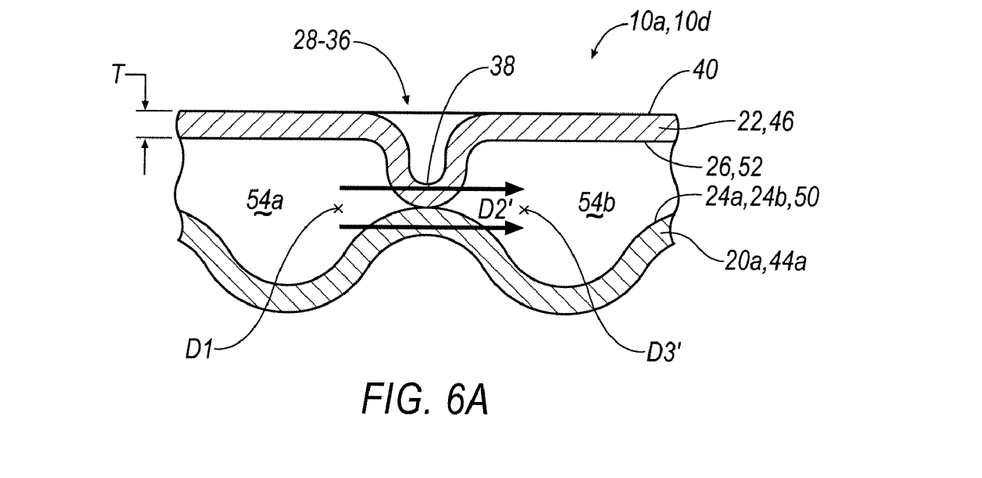
FIG. 6A illustrates a cross-sectional view of the filter media of FIG. 5C according to line 6A-6A.
Figure 6B:
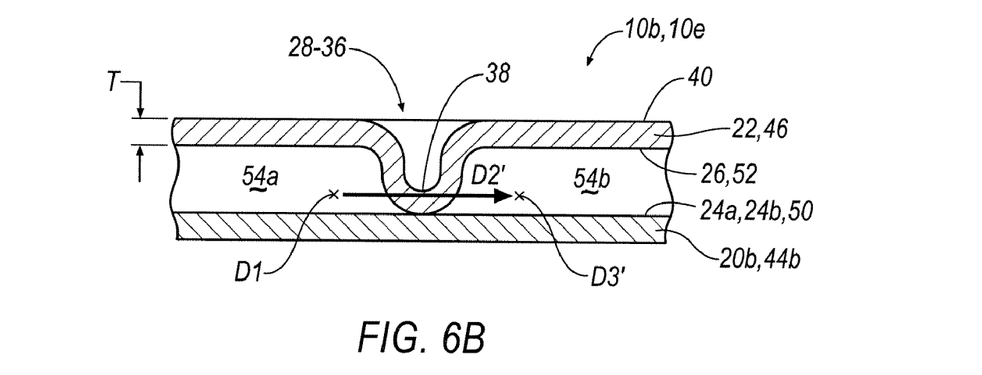
FIGS. 6B and 6C illustrate cross-sectional views of alternate embodiments of the filter media of FIG. 6A according to an embodiment.
Figure 6C:
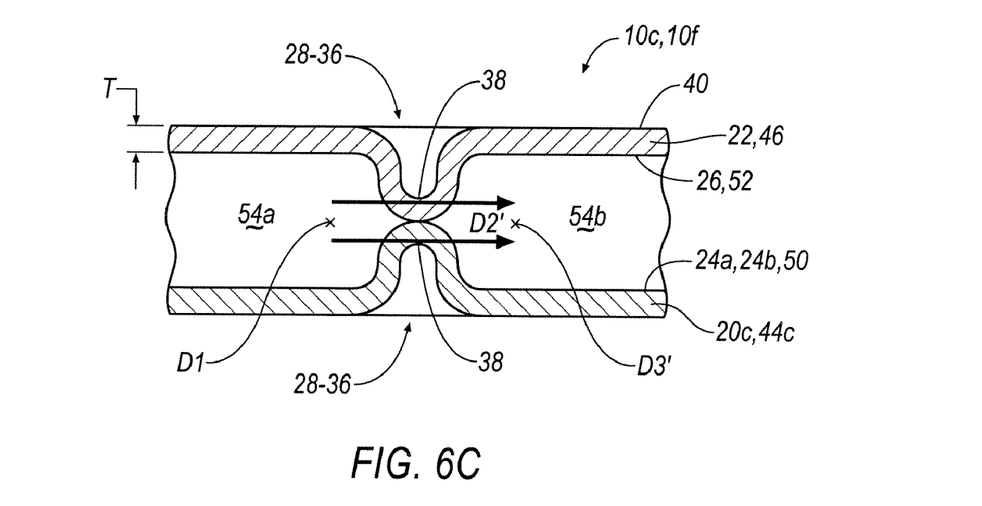
Figure 7A:
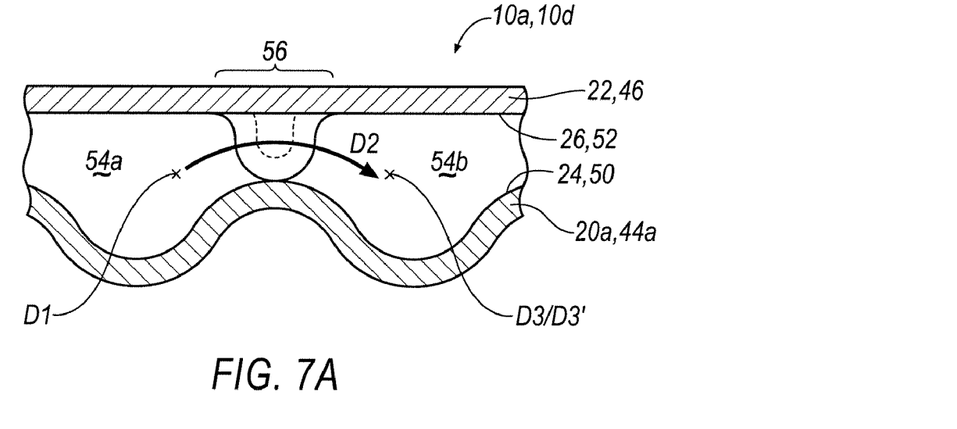
FIG. 7A illustrates a cross-sectional view of the filter media of FIG. 5C according to line 7A-7A.
Figure 7B:
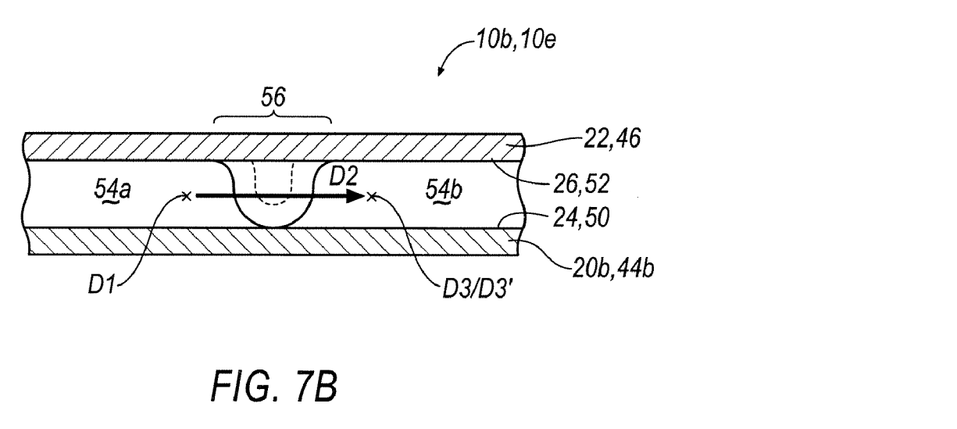
FIGS. 7B and 7C illustrate cross-sectional views of alternate embodiments of the filter media of FIG. 7A according to an embodiment.
Figure 7C:
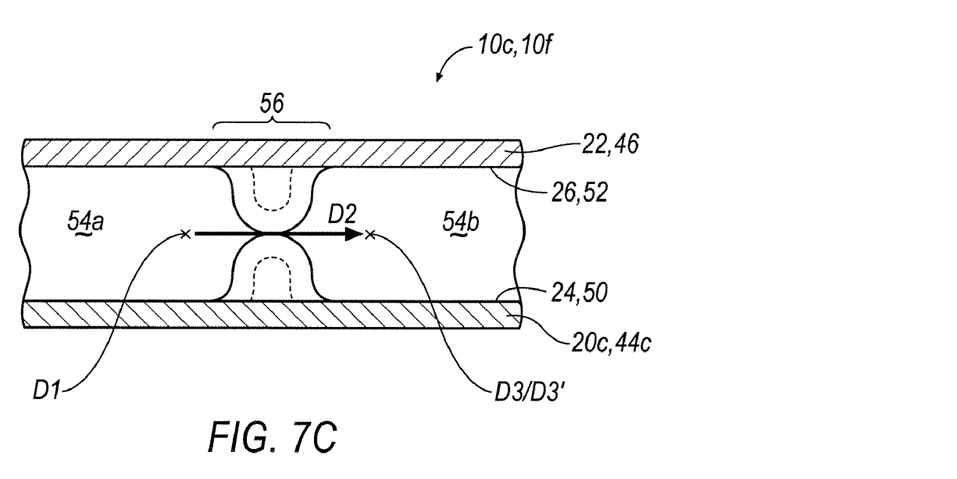

As illustrated in FIGS. 6A-6C, when the one or more facing surfaces 24a, 24b/inner surface 26, 50, 52 are positioned adjacent one another, a plurality of fluid flow channels 54a, 54b are created by the surface irregularity embossments 28-36. Accordingly, as seen in FIGS. 7A-7C, by creating a discontinuity in the surface irregularity embossments 28-36, the irregularity-free region 56 fluidly-connects a first fluid-flow channel 54a with at least a second fluid flow channel 54b so as to direct and more easily permit the flow path according to the arrow, D1, of an unfiltered fluid medium, U, to change its flow path from in the first fluid flow channel 54a to another direction according to the arrow, D2, in the second fluid flow channel 54b, without interruption.

By way of flowing, without interruption, from the first fluid flow channel 54a to the second fluid flow channel 54b according to the direction of the arrow, D2, it will be appreciated that the unfiltered fluid medium, U, does not have to travel through any material (i.e. through the material of the surface irregularity 28-36 or the corrugation of the sheet 20a/first portion 44a) of the filter media 10a -10f to move from a first channel 54a to a second channel 54b. As such, the flow path of the unfiltered fluid medium, U, may first travel: (a) in a first direction, D1 (FIG. 1 and 7A-7C), in the first fluid-flow channel 54a, then (b) in a second direction, D2 (FIGS. 7A-7C), different from the first direction, D1, through the irregularity free region 56, and then (c) in a third direction, D3 (FIGS. 7A-7C), different from the second direction, D2, and substantially parallel to the first direction, D1, within the second fluid flow channel 54b. According to an embodiment, the second direction, D2, is substantially perpendicular to the first and second directions, D1, D3.

Although the flow path according to the directions D1-D3 are related to the uninterrupted flow pattern of the unfiltered fluid medium, U, from the first fluid flow channel 54a to the second fluid flow channel 54b, it will be appreciated that the flow path of the unfiltered fluid medium, U, according to the direction, D1, should and will travel through the sheets of material 20a-20c, 22, 42 according to the direction of the arrow, D2' (FIGS. 6A-6C), to remove undesirable foreign particulates, contaminates, and the like from the unfiltered fluid medium, U, to provide a filtered fluid medium, F, at the second axial end 18. When the flow path of the unfiltered fluid medium, U, according to the direction, D1, is interrupted by the sheet of material 20a-20c, 22, 42 according to the direction of the arrow, D2', the flow path of the unfiltered fluid medium, U, (which is now filtered due to being interrupted by traveling through the sheet of material 20a-20c, 22, 42), may then travel in the second fluid flow channel, 54b according to the direction, D3'.

Thus, when referring to FIGS. 1 and 6A-7C, a fluid medium traveling according to the direction of arrows D1, D2, D3 includes an unfiltered fluid medium, U, and a fluid medium traveling according to the direction of arrows, D2', D3', includes a filtered fluid medium, F. As such, it is possible for a filtered fluid medium, F, to travel according to the direction of arrow, D3', in a second fluid flow channel 54b, then travel through an irregularity-free region 56 according to the direction of the arrow, D2/D2', and continue along the direction of the arrow, D3', in the first or third fluid flow channel 54a, 54c next to the second fluid flow channel 54b.

As referenced above, an exemplary connection of the facing surface 24a of the first sheet 20a-20c with the inner surface 26 of second sheet 22 will now be described. Referring now to FIGS. 3A-3C, a first end bead 58 is disposed between the facing surface 24a of first sheet 20a-20c and the inner surface 26 of second sheet 22. In an embodiment, first end bead 58 blocks one or more of the channels defined between the facing surface 24a of first sheet 20a-20c and the inner surface 26 of second sheet 22. In an embodiment, first end bead 58 blocks all of the channels defined between the two surfaces.

As referenced above, the first sheet 20a-20c and the second sheet 22 now joined by the first end bead 58 are subsequently rolled to create a core of filter layers 14 (as illustrated in FIG. 1 and FIG. 2). In an embodiment, as the rolling step occurs and, before, or as the other face 24b of first sheet 20a-20c contacts an outer surface 25 of the second sheet 22, a second end bead 60 is disposed between the other facing surface 24b of first sheet 20a-20c and the outer surface 25 of second sheet 22. In an embodiment, the second end bead 60 blocks one or more of the channels defined between the other facing surface 24b of first sheet 20a-20c and the outer surface 25 of second sheet 22. In an embodiment, second end bead 60 blocks all of the channels defined between the two surfaces. By this rolled configuration, first end bead 58 and second end bead 60 functionally restrict the unfiltered/filtered fluid medium, U, F, to flow directly through the filter media 10a-10f from the first axial end 16 to the second axial end 18 according to the direction of arrows D1-D3/D3'. Accordingly, the restriction of a direct fluid flow encourages the unfiltered fluid medium, U, to flow through at least one of the sheets of material 20a-20c, 22, 42 according to the direction, D2', as described above in FIGS. 6A-6C, to provide the filtered fluid medium, F.

Referring now to FIGS. 4A-5C, rather than including two end beads 58, 60 as illustrated in FIGS. 3A-3C, the filter media 10d-10f includes a first end bead 58. As illustrated, fluid-flow channels at one end of the filter media 10d-10f is blocked due to the folding over of the sheet of material 42 that includes a first sheet 44a-44c and a second sheet 46.

As the rolling step occurs and, before, or as the other face surface of the first sheet 44a-44c contacts an outer surface of the second sheet 46, an end bead 58 is disposed between the outer facing surface of first sheet 44a-44c and the outer facing surface of second sheet 46. In an embodiment, the end bead 58 substantially prevents a fluid-flow of one or more of the channels defined between the outer facing surfaces of the first and second sheets 44a-44c, 46. In an embodiment, the fold 48 substantially prevents a fluid-flow of one or more channels defined by the inner face surfaces 50, 52.

In an embodiment, the first and/or second beads 58, 60 are respectively located, according to an embodiment, proximate a first end 62 and/or at a second end 64 of the sheet 12, 42 such that the first end 62 is proximate the first axial end 16 and the second end 62 is proximate the second axial end 18. It will be appreciated upon considering this disclosure, however, that first end bead and second end bead may be located at any axial position on the invention should not be so limited to the location of the beads.

In an embodiment, both of the first sheet 20a-20c, 44a-44c and the second sheet 22, 46 are permeable and can act as a filter medium. In an embodiment, one of the first sheet 20a-20c 44a-44c and the second sheet 22, 46 are impermeable such that the other sheet acts as a filter medium. The im/permeability of the sheets 20a-20c, 22, 44a-46c, 46 that defines the filter media 10a -10f provides the ability to direct a flow of fluid (i.e., as seen in FIGS. 6A-7C) while, at the same time, filtering the flow of fluid (i.e., as seen in FIGS. 6A-6C). As such, it will be appreciated upon considering this disclosure that the filter media 10a-10f is constructed in a manner that controls fluid flow and filtering.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A filter media for a fluid medium, the filter media comprising:
   a first sheet having an inner surface and an outer surface;
   a second sheet having an inner surface and an outer surface, wherein the inner surface of the first sheet and the inner surface of the second sheet at least in part define at least two fluid channels between the first sheet and the second sheet to define a filter media having a first axial end and a second axial end,
   wherein the at least two fluid channels extend between the first axial end and the second axial end,
   and wherein, interior to said axial ends, the first and second sheets define at least one opening between a first one of said at least two fluid channels and a second one of said at least two fluid channels such that fluid can uninterruptedly flow between the first one of said at least two fluid channels and the second one of the at least two fluid channels,
   and further wherein the at least two fluid channels and the at least one opening are defined at least in part by a surface characteristic of the first sheet and a surface characteristic of the second sheet, wherein the surface characteristic of the one or more facing surfaces of first sheet of material includes a corrugated surface having a series of peaks and valleys.

2. The filter media according to claim 1, wherein the surface characteristic of the inner surface of the second sheet of material includes a plurality interrupted embossments.

3. The filter media according to claim 1, further comprising:
   a generally impermeable bead disposed in said at least two fluid channels at said first axial end to prevent fluid from passing thereby.

4. The filter media according to claim 3, wherein the at least two fluid channels define a first set of channels that are radially disposed about a central axis between first and second axial ends to define a rolled configuration, and wherein the outer surface of the first sheet and the outer surface of the second sheet define a second set of channels in said rolled configuration that are radially disposed about the central axis between said first and second axial ends, the second set of channels being separated from the first set of channels by one of said first sheet and said second sheet.

5. The filter media according to claim 4, further comprising:
   a generally impermeable bead disposed in one or more channels of said second set of channels at said second axial end to prevent fluid from passing thereby to direct fluid through said one of the first sheet and the second sheet separating the first set of channels from the second set of channels.

6. The filter media according to claim 4, wherein, interior to said axial ends, the first and second sheets define at least one opening between a first one of said second set of fluid channels and a second one of said second set of fluid channels such That fluid can uninterruptedly flow between the first one of said second set of fluid channels and the second one of said second set of said fluid channels.

7. The filter media according to claim 1, wherein the first sheet and the second sheet are defined by a single sheet, and wherein the first sheet is folded onto the second sheet about a fold line arranged at one of said first and second axial ends to define the at least two fluid channels.

8. The filter media according to claim 7, wherein the fold line generally interrupts fluid flow from passing therethrough.

9. The filter media according to claim 7, wherein the at least two fluid channels define a first set of channels that are radially disposed about a central axis between first and second axial ends to define a rolled configuration, and wherein the outer surface of the first sheet and the outer surface of the second sheet define a second set of channels in said rolled configuration tat are radially disposed about the central axis between said first and second axial ends, the second set of channels being separated from the first set of channels by one of said first sheet and said second sheet.

10. The filter media according to claim 9, further comprising:
    a generally impermeable bead disposed in one or more channels of said second set of channels at said second axial end to prevent fluid from passing thereby to direct fluid through said one of the first sheet and the second sheet separating the first set of channels from the second set of channels.

11. The filter media according to claim 1, wherein the surface characteristic of the inner surface of the first sheet is generally irregularity-free, wherein the surface characteristic of the inner surface of the second sheet of material includes a plurality of interrupted surface irregularities.

12. The filter media according to claim 11, wherein the plurality of interrupted surface irregularities are interrupted embossments.

13. The filter media according to claim 1, wherein sheet of filter material is rolled about an axis to form a core of filter layers.

14. The filter media according to claim 1, wherein one of said first sheet and second sheet is generally impermeable.

15. A filter media for a fluid medium, the filter media comprising:
    a first sheet having an inner surface and an outer surface;
    a second sheet having an inner surface and an outer surface, wherein the inner surface of the first sheet and the inner surface of the second sheet at least in part define at least two fluid channels between the first sheet and the second sheet to define a filter media having a first axial end and a second axial end;
    a generally impermeable bead disposed in said at least two fluid channels at said first axial end to prevent fluid from passing thereby;
    wherein the at least two fluid channels extend between the first axial end and the second axial end,
    and wherein, interior to said axial ends, the first and second sheets define at least one opening between a first one of said at least two fluid channels and a second one of said at least two fluid channels such that fluid can uninterruptedly flow between the first one of said at least two fluid channels and the second one of the at least two fluid channels,
    and further wherein the at least two fluid channels and the at least one opening are defined at least in pan by a surface characteristic of the first sheet and a surface characteristic of the second sheet.

16. A filter media comprising:
a first sheet of material having one or more facing surfaces; and
a second sheet of material having an inner surface, wherein the first and second sheets of material form,
a first fluid flow channel providing a first fluid flow path, and
at least a second fluid flow channel providing at least a second fluid flow path, wherein the first and second fluid flow channels are adapted to direct a fluid medium, without interruption, between the first fluid flow path and second fluid flow path, wherein sheet of filter material is rolled about an axis to form a core of filter layers, wherein the surface characteristic of the one or more facing surfaces of the first sheet of material is irregularity-free, wherein the surface characteristic of the inner surface of the second sheet of material includes a plurality of interrupted surface irregularities, wherein the plurality of interrupted surface irregularities are interrupted embossments.

17. The filter media according to claim 16, wherein the facing surface and the inner surface of the first and second sheets of material are joined together with an adhesive to form a sheet of filter material, wherein the first and the at least a second fluid flow channels are located between the first sheet of material and the second sheet of material and formed by surface characteristics of the facing surface and the inner surface.

18. The filter media according to claim 16, wherein the surface characteristic of the one or more facing surfaces of first sheet of material includes a corrugated surface having a series of peaks and valleys, wherein the surface characteristic of the inner surface of the second sheet of material includes a plurality of interrupted surface irregularities, wherein the plurality of interrupted surface irregularities are interrupted embossments.

19. The filter media according to claim 16, wherein the surface characteristic of the one or more facing surfaces of the first sheet of material and the surface characteristic of the inner surface of the second sheet of material each includes a plurality of interrupted surface irregularities, wherein the plurality of interrupted surface irregularities are interrupted embossments.

20. The filter media according to claim 16 further comprising one or more beads of material located between the one or more facing surfaces of the first sheet of material and the inner surface of the second sheet of material.

21. A filter media comprising:
a sheet of filter material including,
a first portion having an inner surface, and
a second portion having an inner surface,
wherein the first portion and the second portion define a fold line, wherein the inner surfaces are positioned adjacent one another when the first portion and the second portion are folded about the fold line to provide:
a first fluid flow channel providing a first fluid flow path, and
at least a second fluid flow channel providing at least a second fluid flow path,
wherein the first and second fluid flow channels allow uninterrupted fluid movement between the first fluid flow path and the second fluid flow path,
wherein sheet of filter material is rolled about an axis to form a core of filter layers.

22. The filter media according to claim 21, wherein the first and the at least a second fluid flow channels are located between the first and second portions and formed by surface characteristics of the inner surfaces, and wherein the surface characteristic of the inner surface of the second portion includes a plurality of interrupted surface irregularities, wherein the plurality of interrupted surface irregularities are interrupted embossments.

* * * * *